US011372636B2

(12) United States Patent
Ramagiri et al.

(10) Patent No.: US 11,372,636 B2
(45) Date of Patent: Jun. 28, 2022

(54) LIVE UPDATING A VIRTUAL MACHINE VIRTUALIZING PHYSICAL RESOURCES

(71) Applicant: International Business Machines Corporation, Armonk, NY (US)

(72) Inventors: Vani D. Ramagiri, Austin, TX (US); Douglas Griffith, Burnet, TX (US); Anil Kalavakolanu, Austin, TX (US); James A. Pafumi, Leander, TX (US); Evan Allen Zoss, Austin, TX (US); Peter J. Heyrman, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 258 days.

(21) Appl. No.: 16/733,352

(22) Filed: Jan. 3, 2020

(65) Prior Publication Data
US 2021/0208868 A1 Jul. 8, 2021

(51) Int. Cl.
*G06F 8/656* (2018.01)
*G06F 9/50* (2006.01)
*G06F 9/455* (2018.01)

(52) U.S. Cl.
CPC .......... *G06F 8/656* (2018.02); *G06F 9/45558* (2013.01); *G06F 9/5077* (2013.01); *G06F 2009/45562* (2013.01)

(58) Field of Classification Search
None
See application file for complete search history.

(56) References Cited

U.S. PATENT DOCUMENTS

| 9,696,989 | B1 | 7/2017 | Korotaev |
| 9,720,674 | B1 | 8/2017 | Spreha |
| 9,886,265 | B2 | 2/2018 | Coffing et al. |
| 9,934,024 | B2 | 4/2018 | Ashank et al. |

(Continued)

FOREIGN PATENT DOCUMENTS

WO 2015142616 A1 9/2015

OTHER PUBLICATIONS

Giuffrida et al., "Safe and Automatic Live Update for Operating Systems", ACM 2013, ASPLOS'13, Mar. 16-20, 2013, Houston, Texas, USA, https://www.researchgate.net/publication/257943533_Safe_and_Automatic_Live_Update_for_Operating_Systems/link/0f317539dd2cad6925000000.

*Primary Examiner* — Lewis A Bullock, Jr.
*Assistant Examiner* — Melissa A Headly
(74) *Attorney, Agent, or Firm* — Garg Law Firm, PLLC; Rakesh Garg; Nathan Rau

(57) ABSTRACT

For a first virtual machine (VM) executing on a physical machine and virtualizing a set of redundant physical adapters installed in the physical machine, a second VM is instantiated on the physical machine. A first physical adapter is reassigned from the first VM to the second VM, the first physical adapter comprising one of the set of redundant physical adapters, the reassigning performed without rebooting a first operating system executing in the first VM. A second rule configuration of the second VM is updated to match a first rule configuration of the first VM, forming an updated second VM. A hypervisor managing the physical machine is caused to redirect traffic for a first virtual adapter associated with the reassigned first physical adapter to the updated second VM.

20 Claims, 5 Drawing Sheets

(56) References Cited

U.S. PATENT DOCUMENTS

| | | | |
|---|---|---|---|
| 2017/0094034 A1* | 3/2017 | Banerjee | H04L 69/164 |
| 2017/0242756 A1* | 8/2017 | Arroyo | G06F 11/1451 |
| 2018/0089206 A1 | 3/2018 | Tamura et al. | |

* cited by examiner

LIVE UPDATING A VIRTUAL MACHINE VIRTUALIZING PHYSICAL RESOURCES

TECHNICAL FIELD

The present invention relates generally to a method, system, and computer program product for live updating a virtual machine. More particularly, the present invention relates to a method, system, and computer program product for live updating a virtual machine virtualizing physical resources.

BACKGROUND

A virtual machine (VM) is computer software that emulates the physical components of a computer system. A hypervisor is software that manages one or more virtual machines executing on one physical computer system or host. A VM emulates, or virtualizes, physical components of the host, such as processors, memory, and input/output resources for storage, network, and other peripherals, so that to an operating system executing on the VM a virtual component behaves the same as the corresponding physical component.

In one configuration, each VM has its own set of virtualized input/output resources, or adapters. For example, VM 1 might send and receive traffic over an Ethernet network using dedicated virtual network interface card (VNIC) 1, and VM 2 might send and receive traffic over an Ethernet network using dedicated VNIC 2. Both VNIC 1 and VNIC 2 are virtualized versions of one shared physical network interface card (PNIC).

In another configuration, instead of each VM having its own set of virtualized adapters, one VM, called a server hardware management VM, is designated to virtualize some or all adapters in the system for a set of client VMs. For example, both client VM 3 and client VM 4 might send and receive traffic over an Ethernet network not over dedicated VNICs, but using the resources provided by their server hardware management VM instead. In some systems, a server hardware management VM is also called a virtual input/output (VIO) server or VIOS.

Live updating refers to updating an operating system, or portion of the operating system, without restarting the operating system. Because the operating system does not need to be restarted, it remains live, able to provide services to applications executing on the operating system. Updating an operating system implements bug fixes and additional functionality.

SUMMARY

The illustrative embodiments provide a method, system, and computer program product. An embodiment includes a method that instantiates, for a first virtual machine (VM) executing on a physical machine, a second VM on the physical machine, the first VM virtualizing a set of redundant physical adapters installed in the physical machine. An embodiment reassigns a first physical adapter from the first VM to the second VM, the first physical adapter comprising one of the set of redundant physical adapters, the reassigning performed without rebooting a first operating system executing in the first VM. An embodiment updates, forming an updated second VM, a second rule configuration of the second VM to match a first rule configuration of the first VM. An embodiment causes a hypervisor managing the physical machine to redirect traffic for a first virtual adapter associated with the reassigned first physical adapter to the updated second VM.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
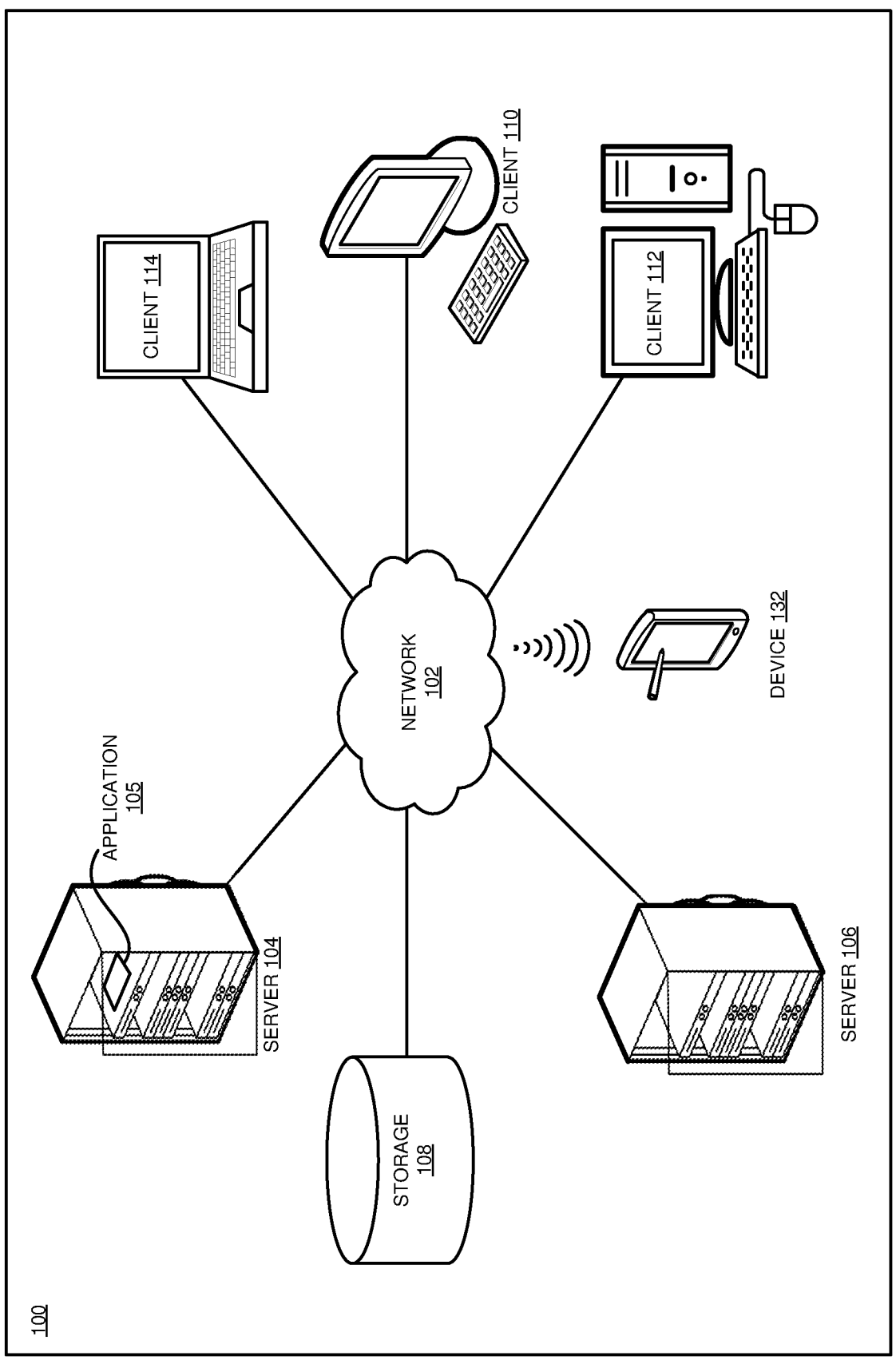
FIG. 1 depicts a block diagram of a network of data processing systems in which illustrative embodiments may be implemented.

The illustrative embodiments recognize that updating an operating system can be performed by stopping applications currently executing on the operating system, applying the updates, and restarting the operating system and applications. However, the updating process can be time consuming. In addition, because the operating system is unavailable for normal use during the updating process, applications executing on the operating system are also unavailable for use during updating. As a result, a live update capability, without the necessity for rebooting the operating system, is preferred.

The illustrative embodiments also recognize that live updating a VM with its own set of virtualized adapters can be implemented by instantiating a new VM, applying the updates to the new VM, duplicating virtual resources of the old VM on the new VM, then moving executing processes from the old VM to the new VM. Duplicating virtual adapters simply requires duplicating a mapping between a virtual adapter and a corresponding physical adapter. However, because in order to virtualize a set of physical adapters a server hardware management VM must maintain exclusive access to each physical adapter being virtualized, a server hardware management VM cannot be live updated simply by duplicating mappings. As a result, the illustrative embodiments that there is an unmet need for a method of live updating a server hardware management VM virtualizing physical input/output resources, or adapters.

The illustrative embodiments recognize that the presently available tools or solutions do not address these needs or provide adequate solutions for these needs. The illustrative embodiments used to describe the invention generally address and solve the above-described problems and other problems related to live updating a virtual machine virtualizing physical resources.

An embodiment can be implemented as a software application. The application implementing an embodiment can be configured as a modification of an existing VM management system such as a Hardware Management Console (HMC) implementation, as a separate application that operates in conjunction with an existing VM management system, a standalone application, or some combination thereof.

Particularly, some illustrative embodiments provide a method that live updates a first VM executing on a physical machine and virtualizing a set of redundant physical adapters installed in the physical machine by instantiating a second VM, reassigning a portion of the redundant physical adapters from the first VM to the second VM, duplicating the first VM's rule configuration on the second VM, redirecting traffic for the reassigned physical adapters to the second VM, reassigning the remainder of the redundant physical adapters from the first VM to the second VM, and redirecting traffic for the now-reassigned physical adapters to the second VM.

An embodiment starts with a source VM to be live updated. The source VM is executing on a physical machine and acting as a server hardware management VM, virtualizing a set of redundant physical adapters installed in the physical machine for one or more VM clients. The set of redundant physical adapters includes at least two adapters having an identical connectivity, although the set need not contain an even number of adapters and the adapters need not have identical capabilities. As a non-limiting example, the source VM might be virtualizing a pair of Ethernet adapters (one with 10 gigabit per second capability and one with 100 gigabit per second capability), three Fibre Channel adapters, and a set of adapters interfacing to a storage device. (Fibre Channel is a registered trademark of Fibre Channel Industry Association in the United States and other countries.) In data centers, physical machines are typically configured with sets of redundant physical adapters for redundancy, configuration flexibility, and backup capability if one adapter of a redundant set fails.

An embodiment instantiates a second, surrogate VM on the same physical machine as the source VM. The surrogate VM has the same processor, memory, virtual, and physical adapter configuration as the source VM, although in the surrogate VM the virtual and physical adapters are in an offline state upon VM instantiation. In instantiating the surrogate VM, an embodiment includes an update to software of the surrogate VM, so that the surrogate VM is an updated version of the source VM. Some source VMs are not configured to virtualize a set of network adapters, for example because they serve as storage-only server hardware management VMs. If a source VM is not configured to virtualize a set of network adapters, an embodiment temporarily configures the surrogate VM as a client VM of another server hardware management VM executing on the same physical machine that does virtualize a set of network adapters to obtain any necessary network access during the instantiation and configuration process.

An embodiment reassigns at least one of each set of redundant physical adapters from the source VM to the surrogate VM, without rebooting an operating system executing in the source VM. For example, if the source VM is virtualizing a pair of Ethernet adapters and four Fibre Channel adapters, one Ethernet adapter and one, two, or three of the Fibre Channel adapters are reassigned to the surrogate VM. Reassigning only a portion of each set of redundant physical adapters allows client VMs of the source VM to access necessary resources via the remaining, untransferred adapters during the update process. To reassign a physical adapter from one server hardware management VM to another within the same physical system, without a reboot, one embodiment performs a dynamic logical partition (DLPAR) operation. Other operations that reassign a physical adapter from one server hardware management VM to another within the same physical system, without a reboot, are also possible, and the same are contemplated within the scope of the illustrative embodiments.

An embodiment updates a rule configuration of the surrogate VM to match the rule configuration of the source VM. One embodiment saves a rule configuration of the source VM prior to beginning the live update process, and copies the saved configuration to the surrogate VM after instantiation.

An embodiment causes the surrogate VM to associate, or bind, a virtual adapter with each corresponding physical adapter according to the adapter configuration on the source VM. A virtual adapter at a client VM communicates with a bound virtual adapter at a source or surrogate VM. Thus, an embodiment also causes a hypervisor managing the physical machine to redirect client VM traffic for each bound virtual adapter from the source VM to the surrogate VM. At this point, the surrogate VM is servicing client VMs using a physical adapter already reassigned to the surrogate VM and bound to a corresponding virtual adapter of the surrogate VM, and the source VM is servicing client VMs using a physical adapter remaining assigned to the source VM and bound to a virtual adapter of the source VM. As a result, client VMs experience no downtime, and only about two milliseconds of delay at the switchover to the surrogate VM.

Once the surrogate VM is available to service client VMs, an embodiment reassigns the remaining physical adapters from the source VM to the surrogate VM, without a reboot of an operating system executing on the source VM, in a manner described herein. For each reassigned physical adapter, an embodiment binds a virtual adapter with each corresponding physical adapter according to the adapter configuration on the source VM. An embodiment also causes a hypervisor managing the physical machine to redirect client VM traffic for each virtual adapter associated with a corresponding physical adapter to the surrogate VM. At this point, the surrogate VM is servicing client VMs using all of the physical adapters that were originally assigned to the source VM, and the source VM is no longer necessary and can be reconfigured, reassigned to another use, or retired from use. Thus, the surrogate VM is a live-updated version of the source VM.

An embodiment is configurable to reassign portions of each set of redundant physical adapters and redirect traffic to the reassigned physical adapters in more than two phases. For example, if a source VM is virtualizing four of a particular type of physical adapter, the source VM can be live-updated by moving one physical adapter at a time, two physical adapters at a time, moving one adapter and then the remaining three, or moving three adapters and then the remaining one. In addition, an embodiment is configurable to move one type of physical adapter at a time or portions of each type of adapter the source VM is virtualizing during each phase, or any combination of type of physical adapter during each phase.

The manner of live updating a virtual machine virtualizing physical resources described herein is unavailable in the presently available methods in the technological field of endeavor pertaining to VM management. A method of an embodiment described herein, when implemented to execute on a device or data processing system, comprises substantial advancement of the functionality of that device or data processing system in instantiating a second VM, reassigning a portion of the redundant physical adapters from the first VM to the second VM, duplicating the first VM's rule configuration on the second VM, redirecting traffic for the reassigned physical adapters to the second VM, reassigning the remainder of the redundant physical adapters from the first VM to the second VM, and redirecting traffic for the now-reassigned physical adapters to the second VM.

An embodiment can also be adapted to update a hypervisor with minimal (for example, 2-3 milliseconds) downtime in a similar manner, by instantiating a second, updated hypervisor, on the same physical machine as the hypervisor to be updated, and having operating systems on client VMs of the hypervisor redirect traffic from the previous hypervisor to the updated hypervisor.

The illustrative embodiments are described with respect to certain types of physical adapters, virtual adapters, physical machines, VMs, server hardware management VMs, client VMs, assignments, redirections, configurations, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
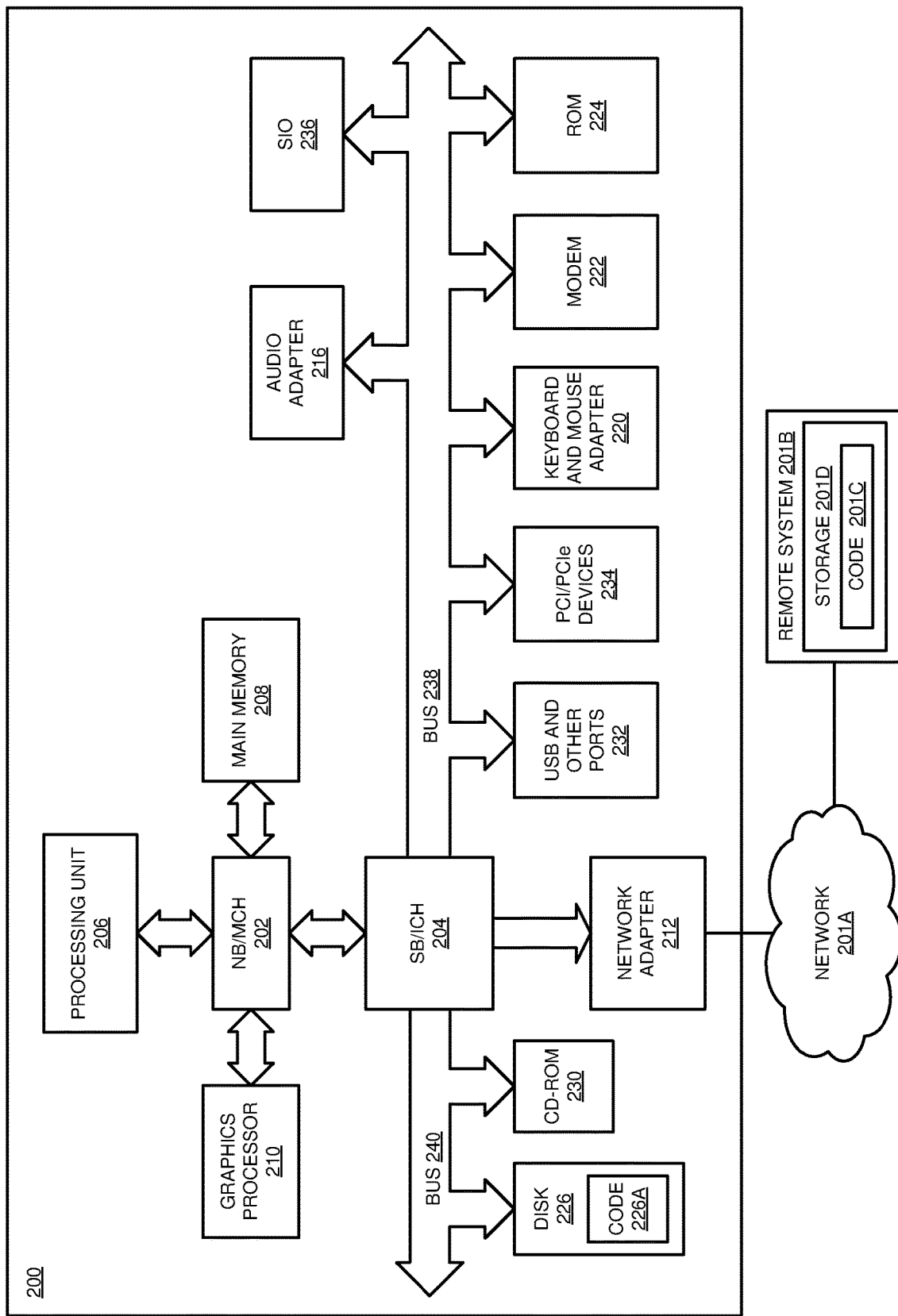
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
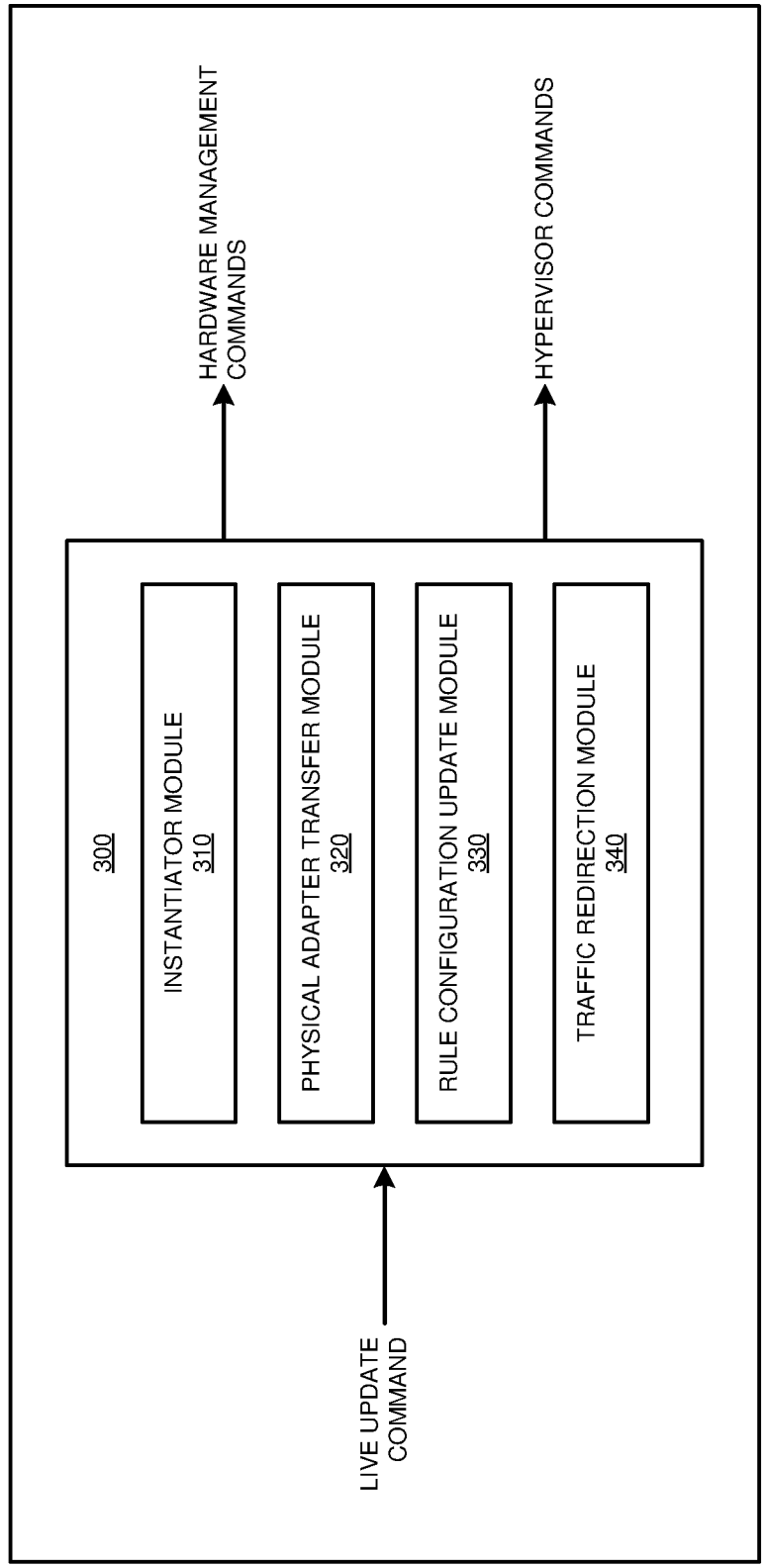
FIG. 3 depicts a block diagram of an example configuration for live updating a virtual machine virtualizing physical resources in accordance with an illustrative embodiment.

With reference to FIG. 3, this figure depicts a block diagram of an example configuration for live updating a virtual machine virtualizing physical resources in accordance with an illustrative embodiment. Application 300 is an example of application 105 in FIG. 1 and executes in any of servers 104 and 106, clients 110, 112, and 114, and device 132 in FIG. 1.

Instantiator module 310 instantiates a second, surrogate VM on the same physical machine as the source VM. The surrogate VM has the same processor, memory, virtual, and physical adapter configuration as the source VM, although in the surrogate VM the virtual and physical adapters are in an offline state upon VM instantiation. In instantiating the surrogate VM, module 310 includes an update to software of the surrogate VM, so that the surrogate VM is an updated version of the source VM. If a source VM is not configured to virtualize a set of network adapters, module 310 temporarily configures the surrogate VM as a client VM of another server hardware management VM executing on the same physical machine that does virtualize a set of network adapters to obtain any necessary network access during the instantiation and configuration process.

Physical adapter transfer module 320 reassigns at least one of each set of redundant physical adapters from the source VM to the surrogate VM. To reassign a physical adapter from one server hardware management VM to another within the same physical system, module 320 performs a dynamic logical partitioning (DLPAR) operation.

Rule configuration update module 330 updates a rule configuration of the surrogate VM to match the rule configuration of the source VM. One implementation of module 330 saves a rule configuration of the source VM prior to beginning the live update process, and copies the saved configuration to the surrogate VM after instantiation.

Traffic redirection module 340 causes the surrogate VM to associate, or bind, a virtual adapter with each corresponding physical adapter according to the adapter configuration on the source VM. Module 340 also causes a hypervisor managing the physical machine to redirect client VM traffic for each bound virtual adapter from the source VM to the surrogate VM. At this point, the surrogate VM is servicing client VMs using a physical adapter already reassigned to the surrogate VM and bound to a corresponding virtual adapter of the surrogate VM, and the source VM is servicing client VMs using a physical adapter remaining assigned to the source VM and bound to a virtual adapter of the source VM.

Once the surrogate VM is available to service client VMs, physical adapter transfer module 320 reassigns the remaining physical adapters from the source VM to the surrogate VM. For each reassigned physical adapter, traffic redirection module 340 binds a virtual adapter with each corresponding physical adapter according to the adapter configuration on the source VM. Module 340 also causes a hypervisor managing the physical machine to redirect client VM traffic for each virtual adapter associated with a corresponding physical adapter to the surrogate VM. At this point, the surrogate VM is servicing client VMs using all of the physical adapters that were originally assigned to the source VM, and the source VM is no longer necessary and can be reconfigured, reassigned to another use, or retired from use. Thus, the surrogate VM is a live-updated version of the source VM.

Figure 4:
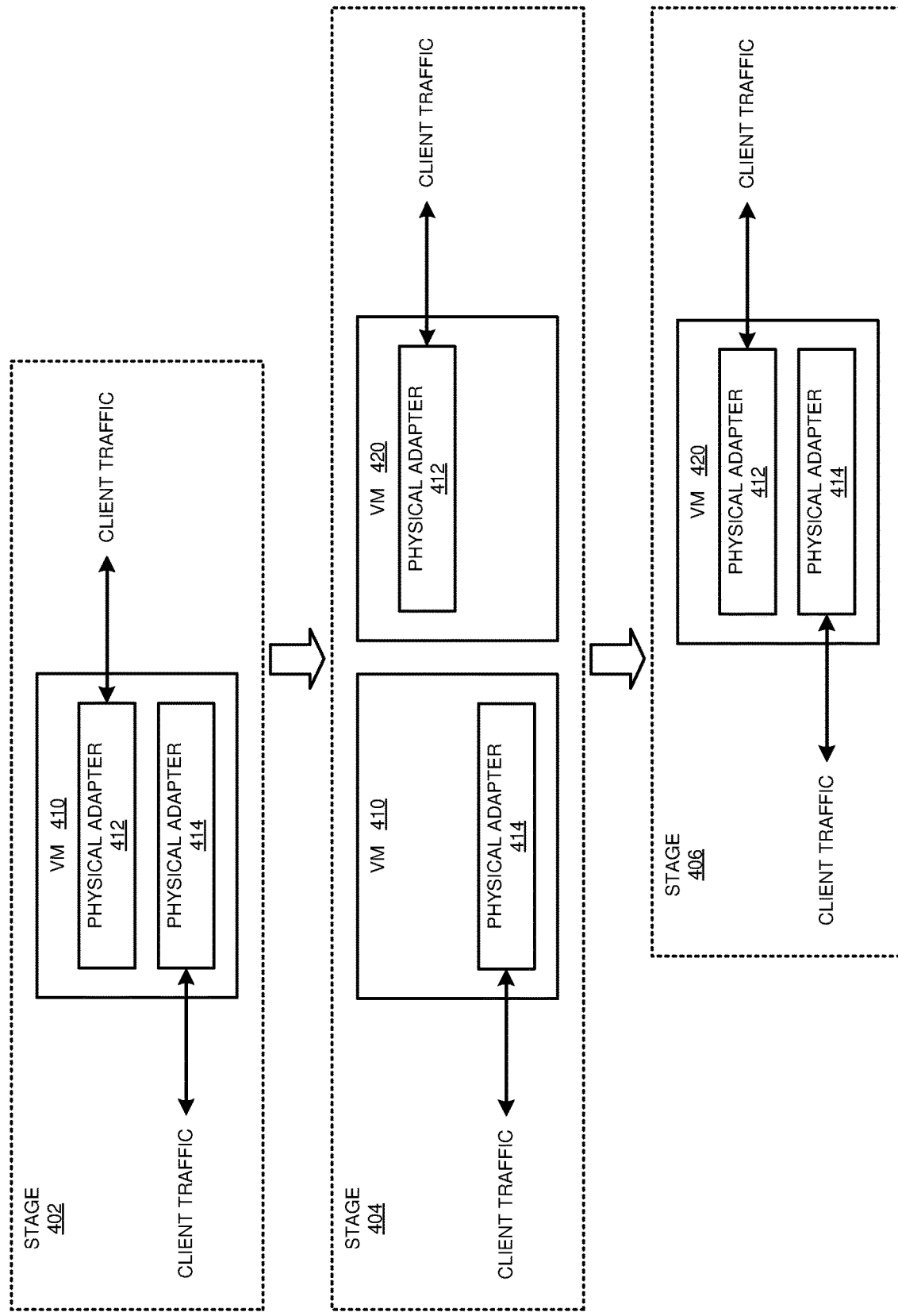
FIG. 4 depicts an example of live updating a virtual machine virtualizing physical resources in accordance with an illustrative embodiment.

With reference to FIG. 4, this figure depicts an example of live updating a virtual machine virtualizing physical resources in accordance with an illustrative embodiment. The example can be executed using application 300 in FIG. 3.

In stage 402, VM 410, a server hardware management VM to be live updated, is executing on a physical machine and virtualizing physical adapters 412 and 414, redundant physical adapters installed in the physical machine. Physical adapters 412 and 414 are both of the same adapter type, and in stage 402 both are servicing client traffic.

In stage 404, VM 420 has been instantiated as a surrogate VM on the same physical machine as VM 410, so that VM 420 is an updated version of VM 410. As well, physical adapter 412 has been reassigned from VM 410 to VM 420, the rule configuration of VM 420 has been updated to match the rule configuration of VM 410, VM 420 has been caused to bind, a virtual adapter with corresponding physical adapter 412 according to the adapter configuration on VM 410, and a hypervisor managing the physical machine has been caused to redirect client VM traffic for physical adapter 412 to VM 420. At this point, VM 420 is servicing client VMs using now-reassigned physical adapter 412, and VM 410 is still servicing client VMs using physical adapter 414.

In stage 406, physical adapter 414 has been reassigned from VM 410 to VM 420, VM 420 has been caused to bind, a virtual adapter with corresponding physical adapter 414 according to the adapter configuration on VM 410, and a hypervisor managing the physical machine has been caused to redirect client VM traffic for physical adapter 414 to VM 420. At this point, VM 420 is servicing client VMs using all of the physical adapters that were originally assigned to VM 410 (physical adapters 412 and 414), and VM 410 is no longer necessary and can be reconfigured, reassigned to another use, or retired from use. Thus, VM 420 is a live-updated version of VM 410.

Figure 5:
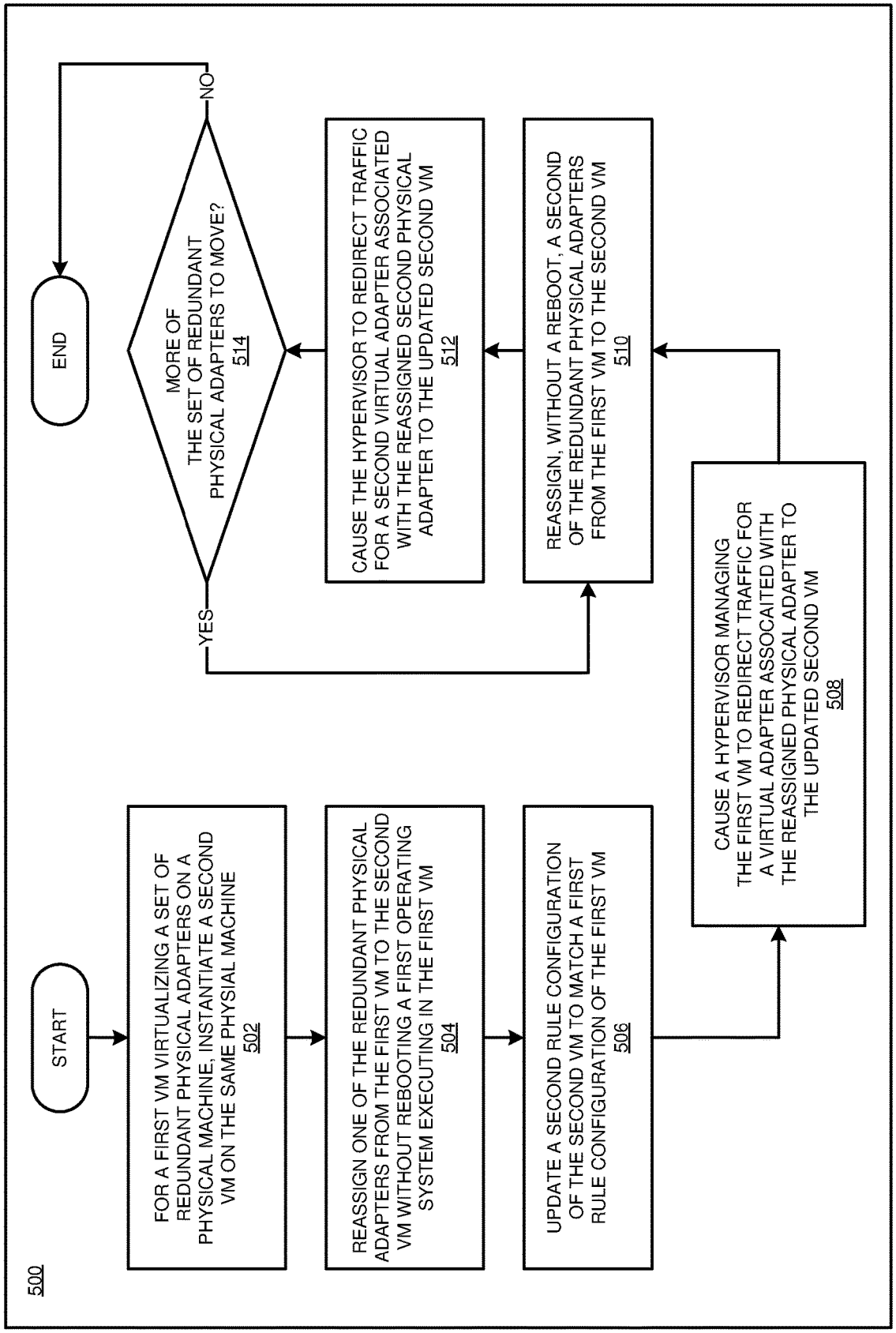
FIG. 5 depicts a flowchart of an example process for live updating a virtual machine virtualizing physical resources in accordance with an illustrative embodiment.

With reference to FIG. 5, this figure depicts a flowchart of an example process for live updating a virtual machine virtualizing physical resources in accordance with an illustrative embodiment. Process 500 can be implemented in application 300 in FIG. 3.

In block 502, the application, for a first VM virtualizing a set of redundant physical adapters on a physical machine, instantiates a second VM on the same physical machine. In block 504, the application reassigns one of the redundant physical adapters from the first VM to the second VM without rebooting a first operating system executing in the first VM. In block 506, the application updates a second rule configuration of the second VM to match a first rule configuration of the first VM. In block 508, the application causes a hypervisor managing the first VM to redirect traffic for a virtual adapter associated with the reassigned physical adapter to the updated second VM. In block 510, the application reassigns, without a reboot, a second of the redundant physical adapters from the first VM to the second VM. In block 512, the application causes the hypervisor to redirect traffic for a second virtual adapter associated with the reassigned second physical adapter to the updated second VM. In block 514, the application checks whether there are more of the set of redundant physical adapters to move from the first VM to the second VM. If yes ("YES" path of block 514), the application returns to block 510. If not ("NO" path of block 514), the application ends.

Thus, a computer implemented method, system or apparatus, and computer program product are provided in the illustrative embodiments for live updating a virtual machine virtualizing physical resources and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    instantiating, for a first virtual machine (VM) executing on a physical machine, a second VM on the physical machine, the first VM virtualizing a set of two or more redundant physical adapters installed in the physical machine, wherein the first VM is associated with a first rule configuration having an adapter configuration for the two or more redundant physical adapters associated with the first VM;
    reassigning a first physical adapter from the first VM to the second VM, the first physical adapter comprising one of the set of redundant physical adapters, the reassigning performed without rebooting a first operating system executing in the first VM;
    in response to the reassigning, generating and binding a second rule configuration to the second VM, wherein the generating of the second rule configuration is generated to match the first rule configuration of the first VM, and the binding comprises binding the first virtual adapter of the reassigned first physical adapter to the second VM according to the second rule configuration; and
    causing a hypervisor managing the physical machine to redirect traffic for the first virtual adapter associated with the reassigned first physical adapter to the second VM.

2. The computer-implemented method of claim 1, wherein instantiating the second VM comprises updating software of the second VM relative to software of the first VM.

3. The computer-implemented method of claim 1, wherein reassigning the first physical adapter from the first VM to the second VM is performed using a dynamic logical partitioning operation.

4. The computer-implemented method of claim 1, wherein generating and binding a second rule configuration comprises copying the first rule configuration to the second VM.

5. The computer-implemented method of claim 1, further comprising, prior to causing the hypervisor to redirect traffic for the first virtual adapter associated with the reassigned first physical adapter to the second VM, associating the first virtual adapter with the reassigned first physical adapter.

6. The computer-implemented method of claim 1, further comprising:
    reassigning a second physical adapter from the first VM to the second VM, the second physical adapter comprising one of the set of redundant physical adapters; and
    causing the hypervisor to redirect traffic for a second virtual adapter associated with the reassigned second physical adapter to the second VM.

7. A computer usable program product comprising one or more computer-readable storage devices, and program instructions stored on at least one of the one or more storage devices, the stored program instructions comprising:
    program instructions to instantiate, for a first virtual machine (VM) executing on a physical machine, a second VM on the physical machine, the first VM virtualizing a set of two or more redundant physical adapters installed in the physical machine, wherein the first VM is associated with a first rule configuration having an adapter configuration for the two or more redundant physical adapters associated with the first VM;
    program instructions to reassign a first physical adapter from the first VM to the second VM, the first physical adapter comprising one of the set of redundant physical adapters, the reassigning performed without rebooting a first operating system executing in the first VM;

program instructions to, in response to the reassigning, generate and bind a second rule configuration to the second VM, wherein the generating of the second rule configuration is generated to match the first rule configuration of the first VM, and the binding comprises binding the first virtual adapter of the reassigned first physical adapter to the second VM according to the second rule configuration; and program instructions to cause a hypervisor managing the physical machine, to redirect traffic for the first virtual adapter associated with the reassigned first physical adapter to the second VM.

8. The computer usable program product of claim 7, wherein program instructions to instantiate the second VM comprises program instructions to update software of the second VM relative to software of the first VM.

9. The computer usable program product of claim 7, wherein reassigning the first physical adapter from the first VM to the second VM is performed using a dynamic logical partitioning operation.

10. The computer usable program product of claim 7, wherein program instructions to generate and bind the second rule configuration comprises program instructions to copy the first rule configuration of the first VM to the second VM.

11. The computer usable program product of claim 7, further comprising, prior to causing the hypervisor to redirect traffic for the first virtual adapter associated with the reassigned first physical adapter to the second VM, program instructions to associate the first virtual adapter with the reassigned first physical adapter.

12. The computer usable program product of claim 7, further comprising:
   program instructions to reassign a second physical adapter from the first VM to the second VM, the second physical adapter comprising one of the set of redundant physical adapters; and
   program instructions to cause the hypervisor to redirect traffic for a second virtual adapter associated with the reassigned second physical adapter to the second VM.

13. The computer usable program product of claim 7, wherein the stored program instructions are stored in the at least one of the one or more storage devices of a local data processing system, and wherein the stored program instructions are transferred over a network from a remote data processing system.

14. The computer usable program product of claim 7, wherein the stored program instructions are stored in the at least one of the one or more storage devices of a server data processing system, and wherein the stored program instructions are downloaded over a network to a remote data processing system for use in a computer readable storage device associated with the remote data processing system.

15. A computer system comprising one or more processors, one or more computer readable memories, and one or more computer-readable storage devices, and program instructions stored on at least one of the one or more storage devices for execution by at least one of the one or more processors via at least one of the one or more memories, the stored program instructions comprising:
   program instructions to instantiate, for a first virtual machine (VM) executing on a physical machine, a second VM on the physical machine, the first VM virtualizing a set of two or more redundant physical adapters installed in the physical machine, wherein the first VM is associated with a first rule configuration having an adapter configuration for the two or more redundant physical adapters associated with the first VM;
   program instructions to reassign a first physical adapter from the first VM to the second VM, the first physical adapter comprising one of the set of redundant physical adapters, the reassigning performed without rebooting a first operating system executing in the first VM;
   program instructions to, in response to the reassigning, generate and bind a second rule configuration to the second VM, wherein the generating of the second rule configuration is generated to match the first rule configuration of the first VM, and the binding comprises binding the first virtual adapter of the reassigned first physical adapter to the second VM according to the second rule configuration; and
   program instructions to redirect, by a hypervisor managing the physical machine, traffic for the first virtual adapter associated with the reassigned first physical adapter to the second VM.

16. The computer system of claim 15, wherein program instructions to instantiate the second VM comprises program instructions to update software of the second VM relative to software of the first VM.

17. The computer system of claim 15, wherein reassigning the first physical adapter from the first VM to the second VM is performed using a dynamic logical partitioning operation.

18. The computer system of claim 15, wherein program instructions to generate and bind the second rule configuration comprises program instructions to copy the first rule configuration of the first VM to the second VM.

19. The computer system of claim 15, further comprising, prior to causing the hypervisor to redirect traffic for the first virtual adapter associated with the reassigned first physical adapter to the second VM, program instructions to associate the first virtual adapter with the reassigned first physical adapter.

20. The computer system of claim 15, further comprising:
   program instructions to reassign a second physical adapter from the first VM to the second VM, the second physical adapter comprising one of the set of redundant physical adapters; and
   program instructions to cause the hypervisor to redirect traffic for a second virtual adapter associated with the reassigned second physical adapter to the second VM.

\* \* \* \* \*